United States Patent [19]
Cooper

[11] Patent Number: 4,824,581
[45] Date of Patent: Apr. 25, 1989

[54] FILTRATION APPARATUS CONTROL

[75] Inventor: James Cooper, Watton-at-Stone, England

[73] Assignee: Wickham Land Limited, Hertfordshire, England

[21] Appl. No.: 907,213

[22] Filed: Sep. 12, 1986

[30] Foreign Application Priority Data

Sep. 13, 1985 [GB] United Kingdom ................ 8522712

[51] Int. Cl.$^4$ .............................................. B01D 37/04
[52] U.S. Cl. .................................... 210/709; 210/739; 210/744; 210/783; 210/784
[58] Field of Search ............... 210/739, 744, 783, 784, 210/709

[56] References Cited
U.S. PATENT DOCUMENTS

| | | | |
|---|---|---|---|
| 3,322,277 | 5/1967 | Pearson et al. | 210/739 |
| 3,349,682 | 10/1967 | Aulich et al. | 210/783 X |
| 3,477,575 | 11/1969 | Nemec et al. | 210/739 |
| 4,402,834 | 9/1983 | Bastgen et al. | 210/783 X |
| 4,544,489 | 10/1985 | Campbell et al. | 710/739 X |
| 4,587,023 | 5/1986 | Srivatsa et al. | 210/744 |

Primary Examiner—Tom Wyse
Attorney, Agent, or Firm—Young & Thompson

[57] ABSTRACT

In a filtration apparatus in which a flocculant is added to promote flocculation, efficient use of the flocculant is ensured by measuring an operational parameter of the apparatus dependent on the degree of flocculation, and adjusting the amount of flocculant being added to the minimum that causes maximum flocculation. As the operational parameter, measurement can be made of the depth of a pool of the material at the lower end of an upwardly inclined filter belt, or of the resistance to movement of a part of the apparatus e.g. the torque required to rotate a filter drum.

5 Claims, 2 Drawing Sheets

FILTRATION APPARATUS CONTROL

FIELD OF THE INVENTION

The invention relates to a control system for a filtration apparatus in which a flocculant is added to the material to be treated and to a method of operating such a filtration apparatus.

BACKGROUND OF THE INVENTION

In such a filtration apparatus, correct flocculation increases the amount of free water in the treated mixture so that drainage through the filter element or elements is rapid, but the cost of the polymers added to the sludge or slurry to be filtered or dewatered as flocculants is a very considerable item in the running costs and can approximate to the capital cost of the machine in a single year.

The degree of flocculation increases with increasing polymer content to an optimum percentage but then falls only slowly, so that there is little penalty, other than increased cost, attached to overdosing. Moreover, the material to be treated tends to vary in quality so there is consequently a tendency to add excess polymer. Inadequate polymer dosing causes clogging of the filtration elements and spillage.

It is accordingly an object of the invention to provide a control system for a filtration apparatus whereby maximum flocculation is obtained by addition of minimum qualities of flocculant.

It is also an object of the invention to provide a control system for a filtration apparatus whereby throughput of material to be treated may be maximized.

It is also an object of the invention to provide a control system for a filtration apparatus whereby at least substantially automatic operation of the apparatus can be effected.

It is also an object of the invention to provide a method of operation of a filtration apparatus whereby consumption of flocculant can be minimized without adverse effect on efficient filtering.

SUMMARY OF THE INVENTION

The invention accordingly provides a control system for filtration apparatus by which flocculant dosing is controlled in response to continuous or intermittent monitoring of flocculation, preferably sensed in terms of a relevant parameter of the filtering process.

The invention also provides a method of operation of a filtration apparatus including means for mixing with the material to be filtered an additive to effect flocculation, the method comprising continuously or intermittently monitoring the degree of flocculation of the mixture of the material and the additive, and adjusting the amount of the additive supplied to the mixture so as to maintain a substantially optimum degree of flocculation.

Optimization of polymer addition in accordance with the invention permits the throughput of material to be maximized. Thus, the output of a sludge pump feeding the material into the apparatus can be increased, for example, in steps, until correct flocculation can no longer be obtained. Maximum throughput can then be at least approximately obtained by a small reduction of the sludge pump output to a level at which correct flocculation again occurs.

Conveniently, a parameter of the operation of the apparatus dependent on the degree of flocculation is monitored.

Thus the degree of flocculation can be sensed by reference to the behaviour of the mixture undergoing filtering, for example, the geometry assumed by a body of the mixture in the apparatus. Where the mixture is caused to flow onto an upwardly inclined filter belt, the depth of the pool of the mixture formed immediately upstream of the belt can be measured as an indication of the ease with which the liquid content of the mixture is escaping through the belt and thus, for a material of known characteristics, of the degree of flocculation of the mixture. The liquid content can be withdrawn through such a belt by gravity or under vacuum and/or by a squeezing action between the belt and an overlying belt in a multi roller filter.

Alternatively, the degree of flocculation can be measured by reference to its effects on a moving part of the apparatus. Thus where the mixture flows through the cylindrical wall of a rotatable drum, the torque required to rotate the drum is an indication of the ease with which filtration is taking place and thus of the degree of flocculation.

The measurements obtained can be supplied to a control device, for example, a microprocessor, which generates command signals for control of a dosing pump by which the flocculant is supplied for admixture with the material. The control device can also receive inputs dependent on other relevant factors, for example, the solids content of the incoming sludge to be filtered or thickened.

The microprocessor or control device can be arranged to perform other functions, for example, it can monitor the level of the material to be filtered and the level of the polymer additive. Also, in a belt filtration apparatus, belt steering and belt tension can be monitored as can the dimensions of the cake of filtered material appearing at the outlet end of the apparatus. Complete automation of the apparatus can in fact be obtained on the basis of the present invention.

Figure 1:
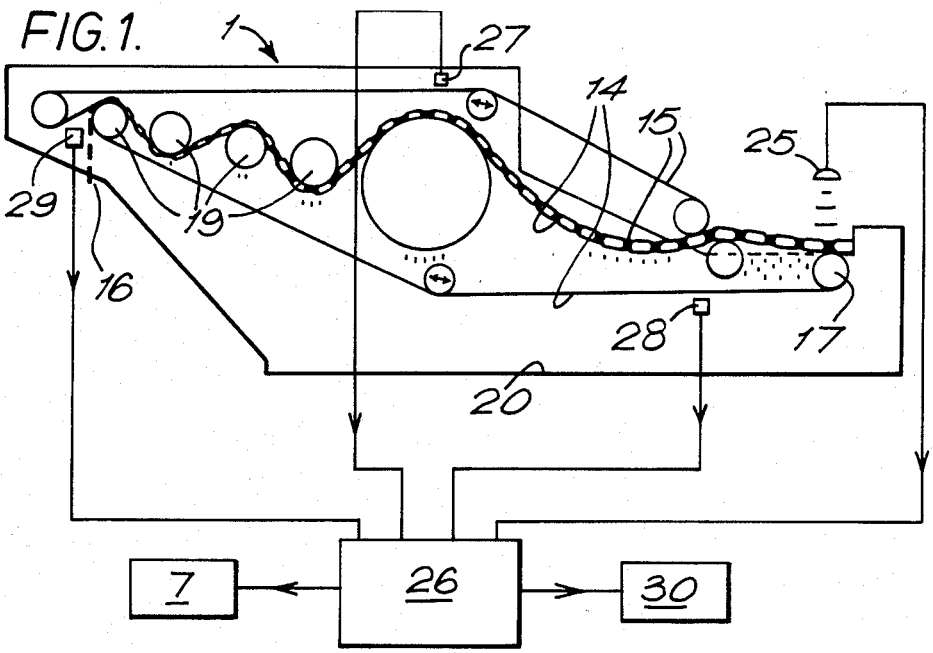
FIG. 1 is a schematic side view of a first illustrative filtration or dewatering apparatus incorporating a control system in accordance with the invention.
Figure 2:
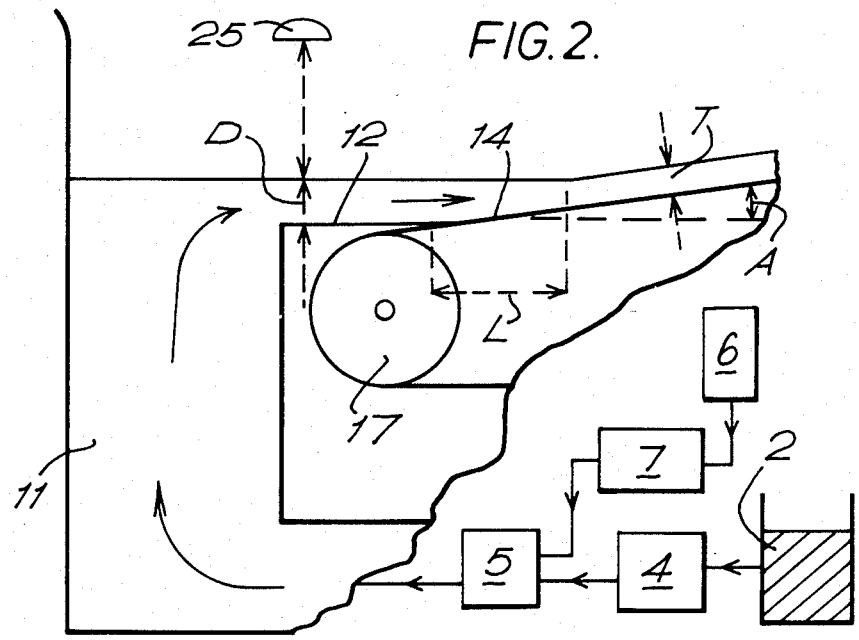
FIG. 2 is a schematic representation of a portion of the apparatus.

The filtration apparatus illustrated in FIGS. 1 and 2 comprises a multi-roller filter 1 with which is associated equipment for supplying to the filter a mixture of a sludge to be dewatered and a polymer or polymers to effect flocculation. The sludge is conveniently drawn from a sludge tank 2, which may be a sludge well or a day tank filled from a main sludge holding tank, by means of a sludge pump 4 by which it is fed to a mixer 5 for admixture with the polymer. The polymer is supplied to the mixer in liquid form, suitably diluted, from make-up equipment 6 by way of a dosing pump 7 driven by a variable speed motor. The make-up equipment can operate on a continuous batch process and can comprise a mixing tank in which the polymer is prepared and a holding or working tank from which the liquid polymer is drawn by the pump 7.

At the filter 1, the sludge and polymer mixture is received first in a retention hopper 11 to enable the polymer to react fully and then overflows across a weir plate 12 onto the lower belt 14 of a pair of belts 14,15 of endless cord weave stainless steel, or of fabric where fine sludges are to be treated. As is apparent from FIG. 2, the plate 12 is a generally horizontal stationary plate. The two belts 14,15, which are carried on a multiplicity of rollers, co-operate to compress the sludge to effect dewatering, and to discharge a dewatered sludge cake at a discharge zone 16, at the downstream end of the filter.

Initially, the sludge and polymer mixture forms a pool of depth D on the weir plate 12, which pool extends into a pool of decreasing depth and length L on a portion of the belt 14 which slopes upwardly from a roller 17 and represents a gravity filtration zone in which free water passes through the belt under the action of gravity. After having travelled over this drainage length L from the edge of the weir plate 12 on the belt 14, the mixture forms a cake of substantially uniform thickness T.

The drainage length L depends on the depth D and to a lesser extent on the cake thickness T which in turn depends on the angle A to the horizontal of the sloping portion of the belt 14. The angle A is an element of the geometry of the filter 1 and is set to suit the particular type of sludge with which the filter has to deal. The angle chosen is such that the partially drained sludge which is capable of being carried up the slope by the belt 14 is also capable of passing through the later stages of the filter without malfunction. The cake thickness T for a steady state running condition is a function of the sludge feed dry solids, the machine throughput, and the drained sludge dry solids as the cake travels up the belt, which is largely dictated by the angle A. For a given steady state running condition, the cake thickness T is a constant which does not vary with the depth D and is independent of the relationship between the depth D and the length L.

It will be evident that a fast draining sludge will have a relatively short length L and correspondingly a relatively shallow depth D. A slower draining sludge would give a longer length L and a greater length D, so the depth D can be regarded as a measure of the degree of flocculation of the sludge and polymer mixture.

Upstream of the sloping portion of the belt 14, the cake is carried by movement of the belt between it and the upper filter belt 15, the cake being sandwiched between the belts through a zone in which pressure is applied progressively, so reducing the thickness of the cake and expelling further liquid in a floc stabilisation zone. The two belts 14,15 then guide the cake under and over a series of rollers 19 of successively smaller diameters, representing a pressure zone, in which pressure on the mixture is further gradually increased to continue the dewatering process. Finally, the dewatered sludge cake is discharged downwardly from between the belts at the discharge zone 16 for final disposal. The return runs of the belts 14,15 extend through cleaning zones at which each belt is backwashed by rotating high pressure jets (not shown). The filtrate is collected at the base 20 for the filter for discharge through appropriate filtrate drain pipe arrangements.

The flocculation of the mixture fed to the filter 1 is controlled, in accordance with the invention, by control equipment comprising means for monitoring the sludge depth D in the pool over the weir plate 12 at the upstream end of the filter.

The depth D is measured by means of a sensor 25 which is capable of measuring the distance between it and the surface of the sludge and polymer mixture on the weir plate 12. The distance between the sensor 25 and the weir plate 12 is known, being either a fixed or a selected value, so the result measures the depth D. The sensor 24 can conveniently comprise an ultrasonic non-contact level measuring device, which may incorporate temperature compensation means if appropriate. The sensor output comprises a 4-20 microprocessor 26 which in turn provides a control output to the dosing pump 7. The microprocessor is programmed to ensure that a given depth D is maintained for a minimum addition of the polymer, and a given volume of sludge.

On start-up of the apparatus, an overdose of the polymer is supplied. A search sequence is then begun, by reducing the polymer dose until an increase in the depth D is sensed by the sensor 25. The dose is then increased by a predetermined amount and the search sequence is repeated. After several such search cycles an optimum dose is established and memorized.

The sludge volume, or throughput, is then increased to maximum apparatus capacity, the search sequence being then repeated to ensure that the optimum polymer dose is maintained. This search sequence is arranged to run continuously or at appropriate intervals to take into account variations in sludge content. If the sludge changes so as to adversely affect filtering, the volume throughput is decreased to prevent overloading. These control operations can be effected automatically by appropriate programming of the microprocessor 26 but may be effected partially or completely under manual control, by an operator.

Preferably, the microprocessor 26 receives inputs also from belt steering and tension switches 27 and 28 and from a cake failure switch 29. The microprocessor is then arranged to activate an alarm 30 to provide a warning on detection of any departure of the belt steering or tension, or of the cake dimensions, from predetermined limits, to allow corrective measures to be taken.

Figure 3:
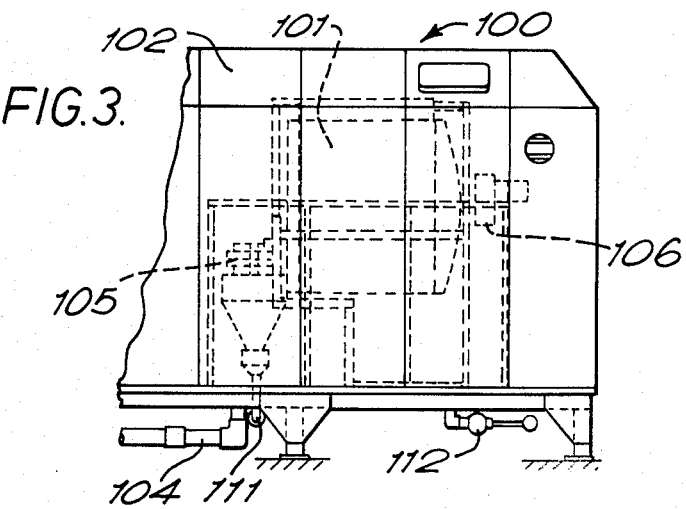
FIGS. 3 and 4 are respectively side and plan views of a second illustrative filtration or sludge thickening apparatus incorporating a control system in accordance with the invention.
Figure 4:
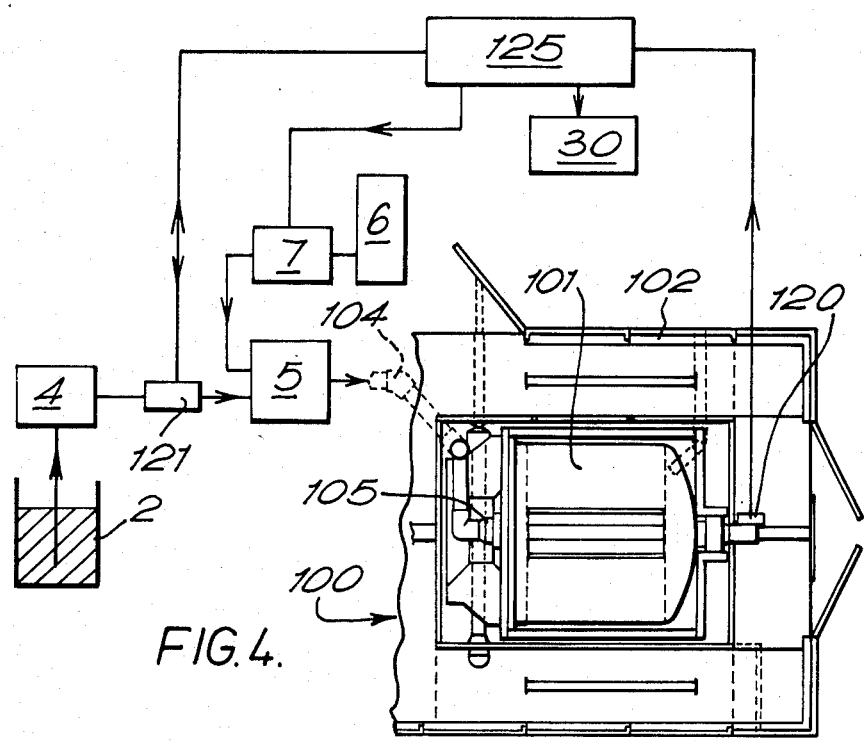

The filtration apparatus 100 illustrated in FIGS. 3 and 4 is a sludge thickening apparatus which can be used alone or in conjunction with a multi roller filter as described with reference to FIGS. 1 and 2. The apparatus 100 can advantageously be used with organic sludges of low molecular weight, as heavy flocs derived from mineral sludges of high molecular weight may be broken up by the tumbling action they experience within it.

The apparatus 100 comprises a spiral drum 101 located within a housing 102 provided with doors, shown open in FIG. 4. The housing contains polymer make-up and supply arrangements, and arrangements for mixing a selectively variable amount of liquid polymer with a sludge to be thickened by filtration; these arrangements may be similar to those described with reference to FIGS. 1 and 2. Thus the sludge to be thickened, admixed with the added flocculant is pumped along a pipe 104 leading from the pumping and dosing equipment into the drum 101 by means of a transfer pump 105 and the drum is driven so as to rotate about its axis by means of a four-speed geared motor unit 106. This rotation of the drum 101 separates the mixture into a thickened sludge, which is pumped out of the apparatus 100 through an outlet 111, and a filtrate which is drawn off through a filtrate outlet 112.

In accordance with the invention, the apparatus 100 incorporates a control system, which can function in a manner generally similar to the control system of FIGS. 1 and 2, but of which an input is dependent on the torque required to rotate the thickener drum 101. The torque required to turn the drum varies with thickening or flocculation of the mixture, the variation in the torque being related to dry solids content of the mixture, the dry solid content of the output mixture and the rotational speed of the drum.

The torque can be measured conveniently by a load cell 120 and the solids content of the incoming sludge can be measured by nucleonic, ultrasonic or vibrating tube type instruments, but preferably by a turbidity sensor 121, which acts by measurement of the attenuation of a light beam through a short path length of the sludge. The turbidity sensor 121 is located between the sludge feed pump 4 and the mixer 5 at which the polymer is added to the sludge, and the outputs of the load cell 120 and the turbidity sensor are applied to a control device in the form of a microprocessor 125.

In use of the apparatus 100, the control system operates under command signals generated in the microprocessor 125. Thus the microprocessor 125 instructs the turbidity sensor 121 to measure the value of the average sludge solids content over a given period of time. If this value represents a significant change from the previously obtained value, the measurement is repeated. If the new value is confirmed, the control system instructs the polymer dosing pump 7 to adjust its output according to a programmed relationship between the sludge dry solids content and the dose rate.

If no significant change in the solids content is measured, no change in the dosing setting is made. After each measurement the microprocessor 125 reads the drum load cell output average over one revolution of the drum 101 and compared this with a programmed relationship between feed sludge solids and drum drive torque. Depending on the results, the microprocessor 125 instructs the dosing pump 7 first to increase or reduce its setting by an appropriate amount. For each new dosing pump setting, the microprocessor instructs the load cell 120 to take a new average reading of drum drive torque after a suitable delay to allow the system to stabilise. According to the torque reading obtained, the microprocessor alters the setting of the dosing pump 7 if appropriate and then repeats the entire process.

The control system is arranged to monitor the sludge only whilst the drum filter 101 is rotating, except that each time the apparatus 100 is restarted to deal with a new well full of sludge, the control system is arranged to monitor the sludge solids constantly by means of the turbidity sensor 121 until any change in sludge solids had been detected and acted upon.

The control system can be arranged to give warning, by way of the alarm 30, of departure of the solids content or the torque outside predetermined limits. The load cell 120 is arranged to be automatically re-zeroed whenever the drum 101 is run in a cleaning mode, to allow for changes in drum bearing friction and this function can be arranged to operate an alarm to warn of bearing deterioration.

Either form of filtration apparatus described or any other embodying the invention can be readily operated at maximum throughput by increasing the rate of supply of material to be treated, either continuously or in steps, until an indication is afforded by the control system that correct flocculation is no longer being obtained in spite of the adjustments to the additive dosing rate that will have been made. A small reduction, for example to the level of the previous steps, then ensures that substantially maximum throughput is achieved.

The control system of the invention can additionally incorporate means for monitoring the level of sludge in one or more sludge storage tanks or wells from which the sludge is fed to the filtration apparatus, and to check the level of liquid polymer in the tank from which the polymer is supplied to the mixer 5. The start of operation of the filter can be made dependent on satisfactory indications from these sensors, the outputs of which can be appropriately treated in the microprocessor of the control system. The control system can further control all the subsidiary equipment at start-up and close down of the apparatus, for example, stirrers in the sludge tank or tanks, extraction fans, back wash equipment, etc.

The invention accordingly allows the operation of a filtration apparatus including a control system embodying it to be completely automated, with optimum polymer dosing and maximum throughput.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. In a method of operating a filtration apparatus comprising the steps of establishing a first flow of a material to be filtered and a second flow of a flocculant adapted to assist filtration of said material when admixed therewith, mixing said first and second flows in a controllable proportion to form a mixture, forming a pool of said mixture from which said mixture flows to between two filter belts for extraction of moisture, measuring the depth of said pool as a measure of the degree of flocculation of said mixture, and controlling the proportions of said material and said flocculant in said mixture in response to said measured depth to obtain a predetermined optimum degree of flocculation, the improvement comprising forming said pool on a generally horizontal stationary plate by flowing said mixture upwardly from below over an edge of said plate, and from an opposed edge of said plate onto an upwardly inclined portion of the lower one of said two filter belts.

2. The method of claim 1, comprising the steps of initially supplying an overdose of said flocculant, reducing the amount of said flocculant added until said depth of said mixture on said plate increases, and subsequently increasing said amount of said flocculant added by a predetermined amount.

3. The method of claim 2, comprising repeating said steps of reducing the amount of flocculant added until said depth increases and then increasing said amount of flocculant added by a predetermined amount to thereby establish an optimum rate of addition of said flocculant.

4. A method of operating a filtration apparatus comprising a rotatable filter drum and drive means for rotating said drum, said method comprising the steps of establishing a first flow of a material to be filtered and a second flow of flocculant adapted to assist filtration of said material when admixed therewith, mixing said flows in a controllable proportion, to form a mixture, feeding said mixture into said rotatable filter drum during rotation thereof by said drive means to separate said mixture into a sludge and a filtrate, measuring the resistance to rotation of said filter drum as a measure of the degree of flocculation of said mixture, and controlling the proportions of said material and said flocculant in said mixture in response to said measured resistance to obtain a predetermined optimum degree of flocculation.

5. The method of claim 4, further comprising the steps of increasing the amount of said mixture supplied to said filtering element until optimum flocculation is no longer obtained, and subsequently slightly reducing the amount of said mixture supplied to said filtering element, to thereby maximize the effective throughput of said filtering element.

* * * * *